J. G. WALKER.
APPARATUS FOR TREATING GARBAGE.
APPLICATION FILED JAN. 10, 1908.

990,688.

Patented Apr. 25, 1911.
3 SHEETS—SHEET 2.

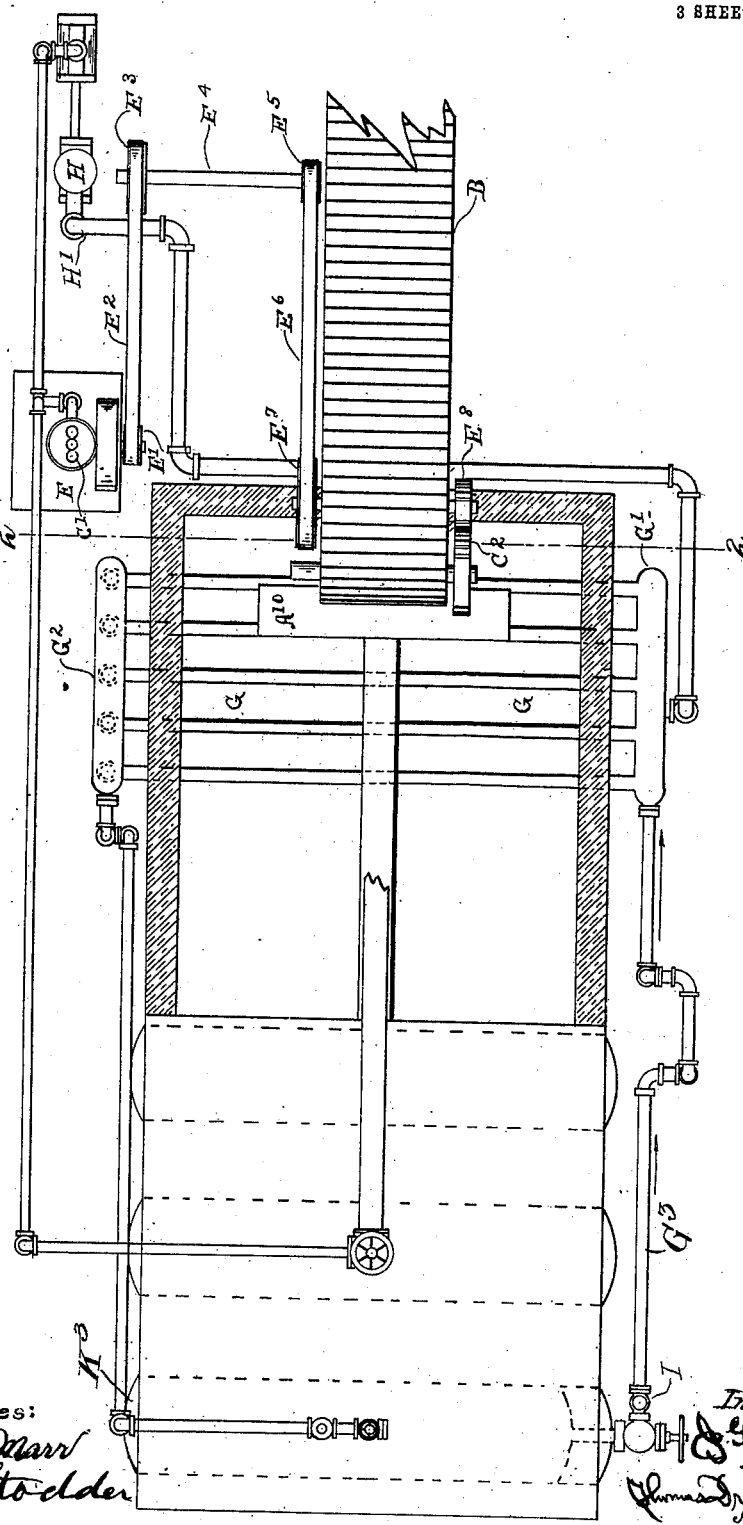

UNITED STATES PATENT OFFICE.

JOHN G. WALKER, OF NEW YORK, N. Y., ASSIGNOR TO JOHN G. WALKER, OF SEWAREN, NEW JERSEY, AND ADOLPH KERN, OF NEW YORK, N. Y.

APPARATUS FOR TREATING GARBAGE.

990,688. Specification of Letters Patent. Patented Apr. 25, 1911.

Application filed January 10, 1908. Serial No. 410,235.

*To all whom it may concern:*

Be it known that I, JOHN G. WALKER, a citizen of the United States, residing in the borough of Brooklyn, in the city and State of New York, mechanical engineer, have invented a certain new and useful Improvement in Apparatus for Treating Garbage; and I do hereby declare that the following is a full and exact description thereof.

My apparatus is of the class adapted to receive the whole or selected portions of the garbage of a town or city and to conveniently and rapidly dispose of it by burning, employing the heat generated to produce steam for useful purposes.

I will in this paper use the word "garbage" to indicate the waste material of whatever grade and whatever degree of combustibility, and though I prefer articles of wood and paper in various conditions my apparatus is also adapted for treating wet and less combustible material. I provide for maintaining an unusually high temperature to decompose the most obstinate forms of organic matter and superior means are provided for utilizing the heat developed by the combustion, consisting of an efficient steam boiler and provisions for heating the feed water therefor, and also for circulating the water, through pipes peculiarly arranged which pipes serve as supports for the burning mass of garbage, and also make it easy to spread the material over the whole horizontal area of the furnaces. I hold up the garbage on its first introduction to the furnace, on these pipes, and provide for an active circulation of water therethrough. An ordinary grate is arranged at a proper distance below. I provide simple means for burning the offensive gases which are otherwise discharged in an unburned condition. It has long been known that these gases can be burned but they require a high degree of heat to ignite them. I provide for burning them by causing them to be intimately mingled with the gas in combustion which is passing from the supply of fuel to the heat absorbing means, the boiler proper, so that they are not only rendered inoffensive to the senses after their discharge from the furnaces, but the heat generated from their combustion is utilized.

The following is a description of what I consider the best means of carrying out the invention.

The accompanying drawings form part of this specification.

Figure 1:
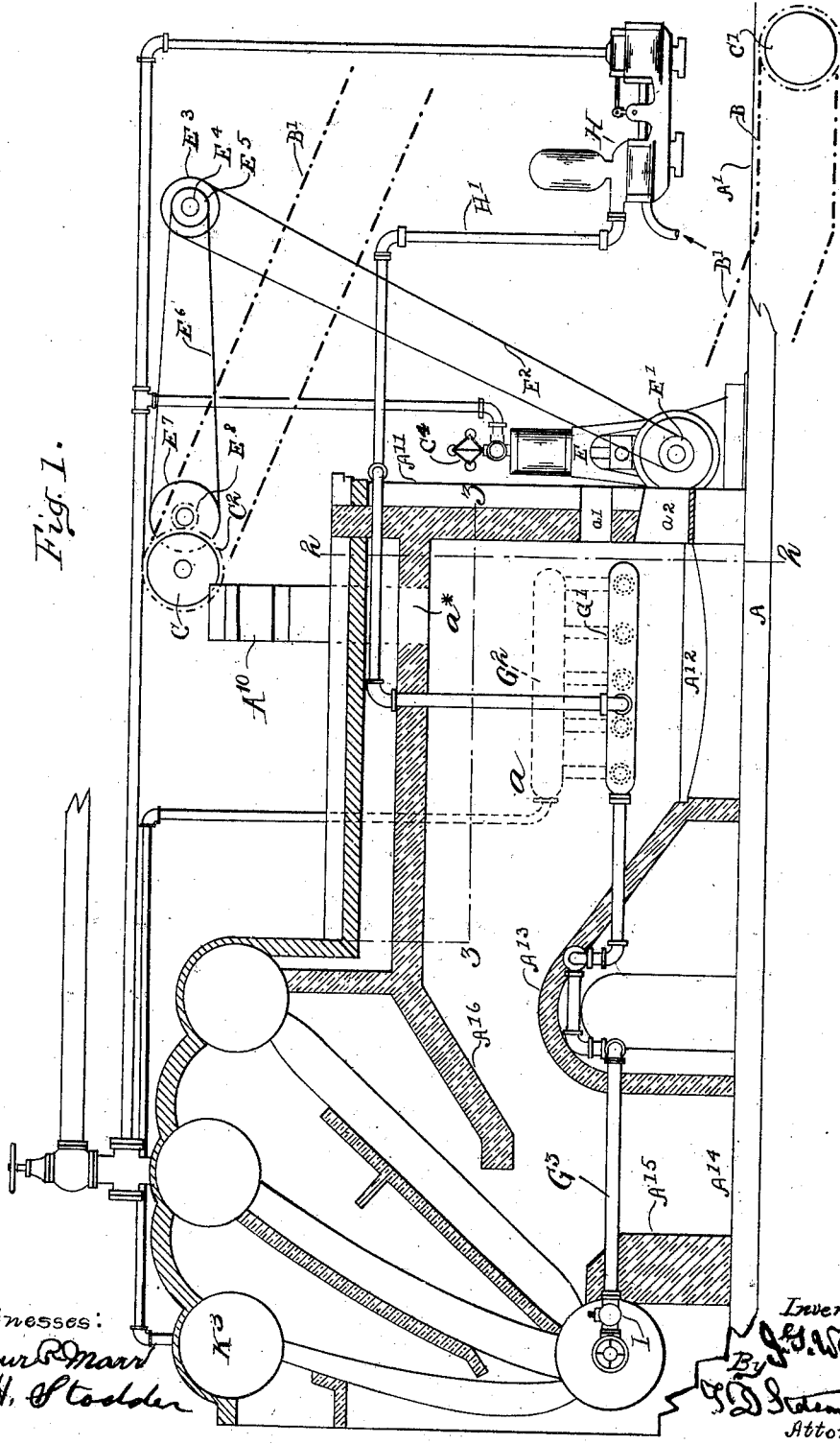
Figure 2:
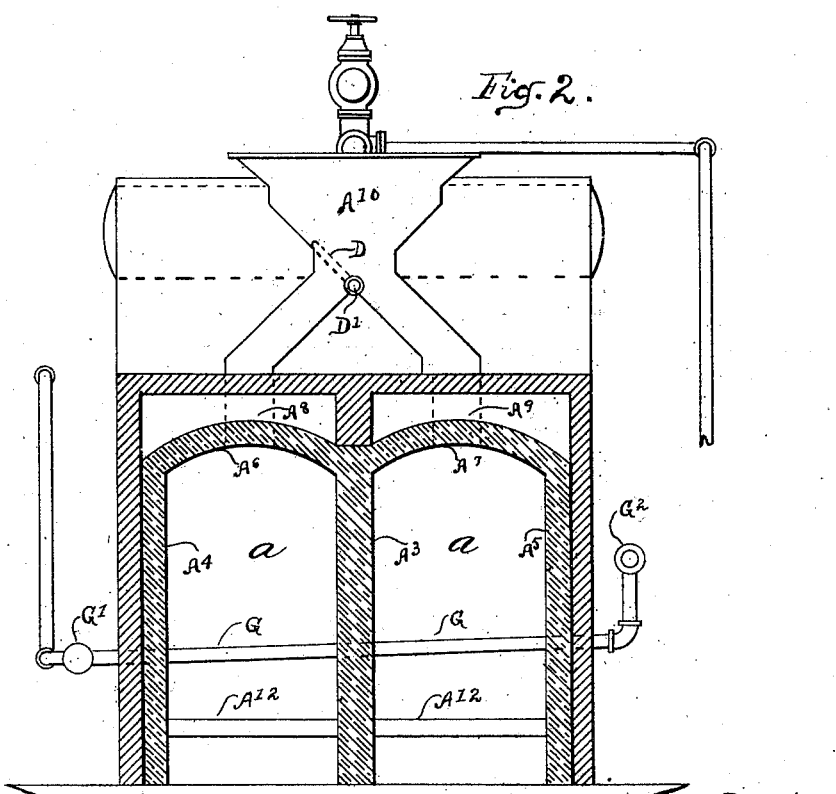

Figure 1 is a side elevational view of the apparatus, a side wall of the furnace being removed to expose the interior thereof. Fig. 2 is a vertical sectional view taken on the line 2—2 of Fig. 1. Fig. 3 is a plan view, the top of the furnace being removed along the line 3—3 of Fig. 1.

Similar letters of reference indicate corresponding parts in all the figures where they appear.

A represents the ground and the fixed framework,—the stationary portions,—of the apparatus. I will use super-numerals to indicate special parts thereof.

$A'$ is a portion of a floor on which the material is dumped in any convenient form after having been subjected to the more or less careful attention of the parties who are permitted to examine it and to select therefrom the portions esteemed worthy of preservation. Between these portions of the flooring, and at the same level or a little below, runs an endless belt or carrier B which latter after having traversed a sufficient distance horizontally, inclines upward as indicated by $B'$. At the top of a sufficient long incline this carrier runs over a drum C and returns to pass around another drum $C'$ and commence again the circuit. The garbage is pushed upon the carrier from one side or the other by the attendants so as to be loaded approximately uniformly on its whole upper side. It is caused to traverse by suitable gearing so as to deliver the material at the rate which the furnace to be now described can conveniently consume it.

$A^3$ is a vertical wall of refractory stone or firebrick which forms a substantial division between two capacious chambers $a$, $a$, which latter constitute the furnaces in which the material is burned.

$A^4$ and $A^5$ are the outer walls and $A^6$ and $A^7$ the arching tops of these furnaces.

$A^8$ and $A^9$ are casings forming passages connecting apertures in the crown of these furnaces with a hopper $A^{10}$, (see Fig. 2). The upper end of the carrier is arranged to deliver the garbage into the open top of this hopper. D is a valve turning on a shaft $D'$, arranged to deflect the material to one or the other of the furnaces from time to time, as desired.

There may be any ordinary provisions not shown as a lever on the shaft D′ for tilting this valve at will;—the attendant who is manipulating the heterogeneous stock brought up by the carrier-apron B knows when he has his furnace sufficiently well filled and may throw the valve D over into the opposite position even if there is a small quantity of stock on it, the material above will ordinarily fall over into the passage on the empty side. Any material which remains on the crowded side will sink soon after.

The furnace and the provisions for taking away the products of combustion are arranged to keep a very close "balance" in the gases so that there will be no flame or gaseous matter rising through the hopper $A^{10}$ and only a little down draft therein.

E is a steam engine of any suitable style actuating a pulley E′ which, by means of a belt $E^2$ running on a larger pulley $E^3$, gives motion to a shaft $E^4$, a small pulley $E^5$, belt $E^6$, large pulley $E^7$ and driving pinion $E^8$ which latter engages with gearing $C^2$ on the drum C. The engine is equipped with a governor $C^4$ which regulates its speed automatically but can by well known means be varied within considerable limits to match the varying rate at which the material is received from the carts, not shown, or consumed in the furnace, or both.

The steam is generated in a boiler which may be of any ordinary or suitable style, I have in my experiments used the well known Stirling boiler and will describe the apparatus as preferably using such. The lower cylindrical portion sometimes termed the mud-drum, is so protected from the hottest gases by a thick wall of masonry $A^{15}$ that the great heat will not burn or blister and thus destroy the drum. The portions above being well heated by the combustion of the gases escaping from the furnaces develop steam liberally. Certain portions of the ordinary material of the character collected by the city authorities will not only burn and evaporate the water therein but will produce large quantities of steam to be utilized in other industries. I esteem important the provisions for feeding the boiler by the smooth and rapid flow of the feed water through small pipes G arranged in the furnace to hold up the garbage above the grate. There is also moved through these pipes the water as it circulates in the boiler, going up with the rising steam and descending alone. This latter I esteem especially important.

I have already described the longitudinal walls and the arching tops of the two furnaces.

$A^{11}$ is the front wall, using the same letter of reference for both furnaces. The highest series of apertures $a'$ are mainly for access for spreading and leveling the garbage covering the whole of the extended, practically horizontal, series of pipes G; (see Fig. 1) there are lower apertures $a^2$ used mainly for raking out portions of the contents of the furnaces when required. It is not intended under any ordinary conditions to supply fuel except the garbage received by the aid of the elevator through the aperture $a^*$ in the crown.

$A^{12}$ is the grate proper which may be of any ordinary style, but it may from the lightness of its duties be less heavy than ordinary grates.

$A^{13}$ is a high firebridge having a long slanted front face depending toward and exposed to the main combustion chamber, a rounded top and a vertical back-face which forms the front wall of a chamber which I call the second combustion chamber, and $A^{14}$ the bottom of said chamber. An important end is served by the liberal space here provided and the provisions for causing the hot products of combustion to descend and circulate therein. The fresh and offensive gases, which chance to escape combustion until this intermediate stage is reached, are here insured a thorough commingling and ignition.

$A^{15}$ is a second bridge-wall protecting the mud-drum.

$A^{16}$ is an inclined descending portion of each furnace crown arranged to retain the hottest gases in the furnace, giving the furnace the quality sometimes designated as reverberatory. All the walls and the crown are thick and the faces exposed to the heat are of good non-conducting and high refractory power. The conditions insure an unusually intense heat. There is no cooling surface exposed to the direct heat in the furnace except the small amount which is now to be described.

G, G, are tubes extending across the furnace in parallel series nearly horizontally and at a sufficient height above the grate to allow for easy raking to remove through the apertures $a^2$ the relatively small quantities of material which remain unburned and which have descended through the wide spaces between the pipes G and have been arrested and held by the grate proper.

G′ is a header connecting the slightly lower ends of the entire series of pipes G. $G^2$ is a corresponding header connecting the other, the higher ends.

H is the feed pump and H′ a pipe conducting the water therefrom which may or may not be previously heated. It maintains an active flow into the lower header G′, and thence through the widely but evenly spaced series of pipes G in the furnace, to be again gathered in the header $G^2$ and led upward and over to $K^3$ the rearmost of the upper drums,—the steam drums of the boiler. Both headers being outside of the non-conducting walls, they perform the duties involved in the distribution of the water from one header G' and its collection from the straight pipes G again in the other header G², outside the walls without injuriously cooling the gases. There are no cooling surfaces within the walls except the smooth straight pipes G, G, and the water circulates rapidly and continuously through these, insuring that the pipes are preserved from being burned, but presenting so little cooling surface on their exteriors as to not subtract appreciably from the heat in the furnace.

I is a check valve adapted to be opened by a slight preponderance in the pressure of the water below. It stands closed while the feed pump is working which may or may not be continuous. Whenever the feed pump stops for any reason the gently descending water in the boiler swings open the check valve I and the flow through the pipes G continues in the same direction, and a circulation only a little less active than before is kept up.

It will be seen that turning the valve D to one side or the other besides deflecting the descending garbage into one furnace also closes the opening at the top of the other. Notwithstanding the smallness of outflow and inflow due to the fact that the proportions give nearly balanced draft, it is good practice to do all the leveling of the imperfect fuel which is required in either furnace during the periods while the top of that furnace is thus closed, so that no flame or gas can rise therefrom through its charging aperture and to keep the apertures $a'$ $a^2$ of the other furnace closed while that furnace is receiving the garbage, so that no air can flow in therethrough during such long periods. But the proportions are such that the pressure of the gases within the chamber $a$ is so nearly that of the external atmosphere that no mischief results from having the small apertures $a'$ $a^2$ as well as the liberal charging apertures at the top always open. There will be only a slight induction of air through any of these apertures whether the others are closed or not.

I have in my experiments set the series of parallel pipes G only a little inclined,—the intention being to insure that when the feed pump is stopped, a gentle circulation shall be continued by the disposition of the heated water to rise, the boiler water flowing from the mud-drum through the check valve, and that the movement of the boiler water through the slightly inclined pipes G, shall thus be continued in the right direction. An open-work platform is thus provided for supporting the garbage practically level,—and that the waste material to be burned shall spread over the whole horizontal extent of the furnace with little or no aid from the attendant. I can attain these ends with the inclination of the pipes G considerably less or greater. I can use larger pipes G and can place them nearer together, but I esteem it an important quality of my apparatus that the cool surfaces thus presented shall be small and that the garbage can be received in every shape and very irregularly in regard to rapidity and quantity and that it will be held up above the grate so as to allow of raking freely below it to remove the unburnable residue.

The first fire-bridge $A^{13}$ is wide and hollow. The water pipe $G^3$ which extends along the side of the double furnace, and forms the means whereby the water of the boiler can travel from the lower drum of the boiler, called the mud drum, to the header G' is formed with short lengths jointed together with short curves constituting right-angled bends. The combination attains three important ends, first, the active circulation through the pipes G whether the feed is on or off; second, the pipe is out of the way so that there is a continuous unobstructed space across the two furnaces which space has been proved by trial is sufficiently cool to be conveniently used as a passage-way for the attendants to move across at will in the performance of their duties, and third, the expansion and contraction is allowed for by the elasticity of the bends.

It will be understood that the provisions for supplying air to the first chamber or furnace are the grate $A^{12}$ with any suitable natural draft or blower according as shall be required to make the required balanced draft and that the provisions for projecting the hot gases down to circulate between the two fire bridges $A^{13}$ and $A^{15}$ is the "droop" $A^{16}$. The gases come from the furnace in streaks and layers with the hottest tending toward the top, and are caused to whirl in that second chamber so that if sufficient air is present any unburned gases are ignited before the gases or the combining air have been cooled by contact with the relatively cool surfaces of the boiler.

I attach importance to the drooping crown $A^{16}$ compelling the gases to descend steeply in their escape from the furnace because it not only retains the hottest flame but also allows the cooler gaseous products of combustion to be permitted to flow away. And I attach importance to the steepness of the plunging discharge of the gases from the furnace and to the depth of the bottom $A^{14}$ and the arrangement of the sides of the pit because these features insure a mixing or churning of the unburned with the burning gases before any contact thereof with the relatively cold boiler, and I attach importance to the fact that thick masonry $A^{15}$ is interposed between the gases thus ignited and the mud drum so as to keep the pit hot and the mud drum cool and consequently filled with dense water. I also attach much importance to the height and length of the front or main firebridge and the abrupt descent into the secondary combustion chamber, as they operate cojointly with the drooping arch to provide just sufficient time and movement to heat and mingle the less combustible gases with the hot gas on its way to chimney.

Modifications may be made without departing from the principle or sacrificing the advantages of the invention.

I can use other types of boiler.

I claim as my invention:

1. In a device of the class described, a furnace, a plurality of approximately flat grates one above the other within said furnace, a high firebridge extending upward from the lowermost grate and in operable relation with both said grates, said firebridge being formed with a long inclined front face a smoothly rounded top and a vertical rear wall, in combination with a curved and drooping arch above said firebridge and extending beyond the rear wall of said bridge, the whole arranged to provide a contracted passage for the gases, the product of combustion in said furnace.

2. In a device of the character described, a furnace having a high firebridge, said bridge being constructed with a slanting front face and a vertical back wall, a second firebridge spaced from said first fire bridge and forming a chamber between them, said two fire bridges in combination with a long drooping arch providing a contracted passage for the products of combustion from said furnace and co-acting with the chamber between the firebridges to produce reverberatory effect.

3. In a device of the character described, the combination with a combustion chamber of a main fire grate and an auxiliary fire grate above said main fire grate and having its bars slightly inclined and at right angles to said main fire grate within said chamber, a high fire bridge adjacent to, and operative with both of said grates, said fire bridge being constructed with a slanting front face extending upward from said grates, a vertical rear wall, and a smoothly rounded top, a second fire bridge spaced from said first fire bridge and forming a chamber between them, said two fire bridges in combination with a long drooping arch providing a contracted passage for the products of combustion from said furnace and co-acting with the chamber between the fire bridges to produce reverberatory effect.

Signed at New York city, N. Y., this 8th day of January, 1908.

JNO. G. WALKER.

Witnesses:
GEO. McKITTRICK,
ARTHUR PHELPS MARR.

---

Copies of this patent may be obtained for five cents each, by addressing the "Commissioner of Patents, Washington, D. C."